Sept. 3, 1946.　　　　E. L. ZEHRBACH　　　　2,406,938
METHOD OF REAMING
Filed Oct. 7, 1943
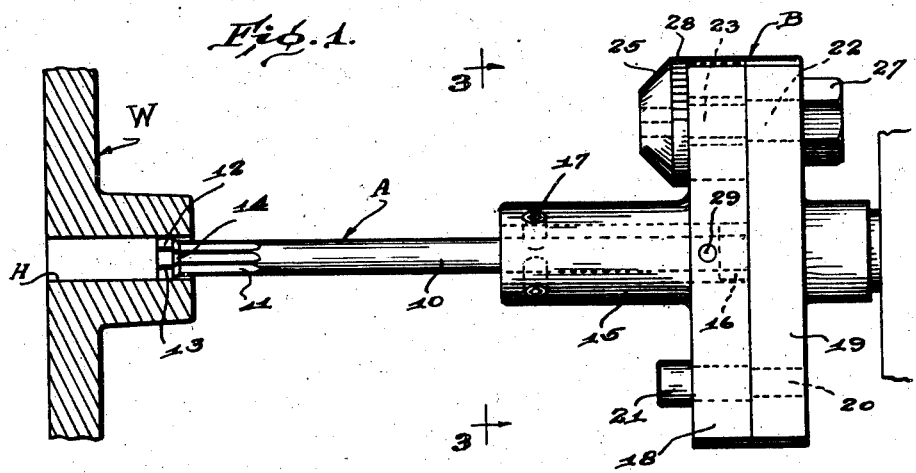
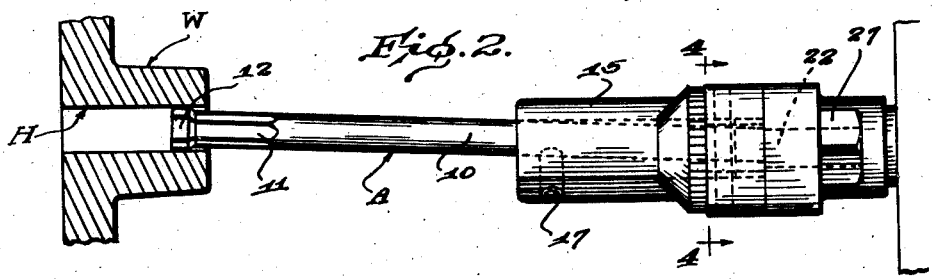
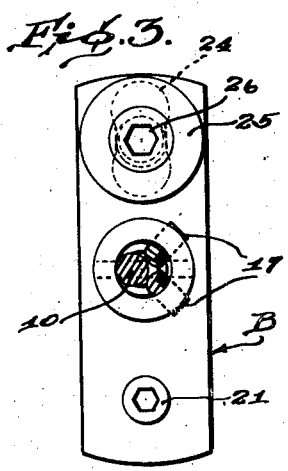
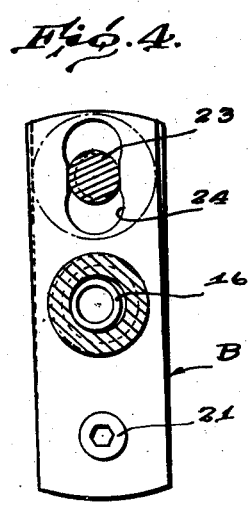
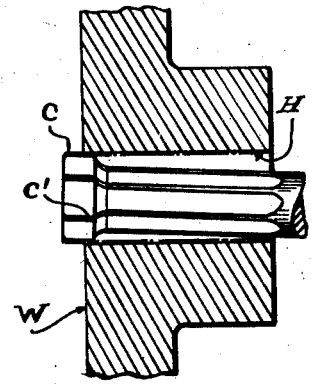
Inventor
E. L. Zehrbach
By　Malcolm W. Pierce
　　　Attorney Patented Sept. 3, 1946

2,406,938

UNITED STATES PATENT OFFICE 2,406,938

METHOD OF REAMING

Edgar L. Zehrbach, Lima, Ohio

Application October 7, 1943, Serial No. 505,284

2 Claims. (Cl. 77—72)

This invention relates to reamers and particularly to reamers used in high precision work.

An object is to produce a new and improved method of reaming by which the position of the tool is adjusted in a simple and convenient manner to control the size of the hole. This is particularly important not only to secure accurate results but also to increase the life of the reamer, it being possible to slightly adjust the reamer after it has been worn to such point that it cannot ream a hole of the desired diameter, so that it will thereafter ream to the desired accuracy in spite of wear. This accomplishes a two-fold result. The life of the reamer is greatly lengthened and also accurate reaming can be effected at all times.

Another object is to produce a simple and efficient method for reaming relatively small holes with greater uniform accuracy than has been possible heretofore.

A further object is to produce a reaming method which militates against the formation of the so-called bell mouth at one or opposite ends of the reamed hole.

A still further object is to produce a new and improved method of reaming holes of any predetermined size within the range of the reamer without changing in any way the form, configuration or structure of the tool itself but by a simple adjustment or alteration of the position of the reamer relative to the work.

Other objects and advantages of the invention will hereinafter appear, and for purposes of illustration but not of limitation, an embodiment of the invention is shown on the accompanying drawing in which Figure 1 is a bottom plan view partly in section showing a lathe mounted reamer holder and reamer, with the latter axially aligned with the hole in the work;

Figure 2 is a top plan view of the parts shown in Figure 1, but with the reamer adjusted to a position with its axis offset from or angularly disposed relative to the axis of the hole to be reamed;

Figure 3 is a view substantially on the line 3—3 of Figure 1;

Figure 4 is a section substantially on the line 4—4 of Figure 2; and

Figure 5 is an enlarged fragmentary sectional view illustrating the operation of the reamer when the same is disposed with the reamer axis eccentric to the axis of the hole to be reamed.

The illustrated embodiment of the invention comprises a reamer A carried by a holder B, the latter being suitably mounted on a lathe. The work W is formed with a hole H to be reamed. As will be readily understood, rotary motion is imparted to the work W during the reaming operation during which relative translatory movement between the holder B and work W is imparted. The reamer has a shank portion 10, a portion of the forward end of which is fluted as indicated at 11 to carry away the cuttings in the usual manner. In advance of the fluted portion 11 and in fixed relation thereto, is a cutting head 12 formed with a suitable number of lands 13 arranged in annular formation. Directly in rear of the lands 13 is an inwardly tapered neck 14 merging with the fluted portion 11.

An important feature of the invention is in the relatively narrow cutting head in rear of which is a shank portion of substantially reduced diameter. The length of the cutting head may vary in accordance with the length of the hole to be reamed, the controlling factor being that the angularity or eccentricity of the reamer relative to the axis of the hole to be reamed must in no case be such that the shank or fluted portion of the reamer will engage the mouth or edge portion of the hole. In other words, with the parts in the position shown in Figure 2, the reamer must be enabled to pass completely through the hole H without the fluted portion 11 or shank 10 engaging the mouth of the hole or that end of the hole in which the reamer is inserted. The reamer shank may be cut away on one side to give a greater angular adjustment if circumstances make this necessary.

In operation it will be manifest that the reamer A can be moved in axial alignment with the hole H as indicated in Figure 1 to effect the desired reaming operation. Oftentimes it is not possible to obtain exact axial alignment. This oftentimes is due to the lathe or other machine on which the reamer is mounted because of wear or inaccuracies in the machine. In such cases, when the ordinary reamer is employed, bell-mouthed holes result and particularly in precision work, this is most objectionable, and results in the scrapping of that part. Bell-mouthed holes can not be reamed with the above described reamer A because even with the reamer A arranged out of axial alignment or eccentrically with respect to the hole to be reamed, there is no possibility of bell-mouthing in view of the shortness of the lands compared with the depth of the hole and the reduced diameter of the shank.

It is found empirically that such eccentricity of the reamer with respect to the axis of the hole to be reamed can be employed to greater advantage in the use of the reamer above described. With the reamer disposed in the position such as indicated on Figures 2 and 5, the cutting action is confined to the areas C and C' or what might be termed the toe or front upper portion of the cutting lands and the heel or lower rearward portion (Figure 5). It will be manifest that by varying the eccentricity or the offset angular relation of the reamer with respect to the axis of the hole to be reamed, the size of the reamed hole can be be varied. The amount of adjustment or eccentricity is governed by the amount of angularity which can be imposed on the reamer without its shank engaging the sides of the hole.

In practice this reamer may first be used in axial alignment with the hole to be reamed. After a period of time, the reamer becomes worn and the normal procedure so far as other reamers are concerned, is to discard it. In this case, continued use of the reamer can be had by angularly adjusting it as above mentioned so that the cutting head does not enter the hole axially but eccentrically. By the use of plug gauges, the workmen can readily determine whether the hole is being reamed under size. In that event, adjustment is made of the reamer an amount sufficient to compensate for the wear. Later on when further wear occurs and the gauge shows that the hole is again under size, a further angular adjustment of the reamer is effected and its use continued. It is found that such reamer can be used over an extended period of time in an exceedingly satisfactory manner without sacrifice to accuracy of the reamed hole.

The holder B is designed to enable such angular adjustment of the reamer to be readily and conveniently effected. As shown, the holder has an outwardly extending barrel or chuck 15 into which the inner end of the shank 10 fits loosely. At the rear end of the barrel is a sleeve 16 which receives the inner end of the shank 10. A pair of angularly disposed adjusting screws 17 arranged on the under side of the barrel are adapted to engage the shank 10 which rests against them by gravity. The inner end of the barrel 15 is fixed to a plate 18 which abuts against a plate 19 suitably fixed to the lathe. The plate 18 is pivotally mounted with respect to the plate 19 by a bolt 20 arranged at one side. The bolt 20 has a head 21 socketed to receive a wrench so that the plates can be loosened sufficiently to effect the desired adjustment. On the other side of the barrel 15 the plates are connected by a bolt 22 which has an eccentric portion 23 disposed within an elongate slot 24 in the plate 18. Fixed to the outer end of the bolt 22 is a dial 25 formed with a socket 26 to receive suitable socket wrench. On the rear side of the plate 19 is a nut 27. The dial 25 is provided with suitable calibrations 28 which may be brought into registration with a suitable mark formed on the plate 18 adjacent thereto.

In practice a plug gauge will show the size of the holes being reamed. If it appears that the holes are too small, then it is necessary that angular adjustment of the reamer A be made. This is effected by first loosening the bolt 20 and then loosening the nut 27. Thereupon by the use of a socket wrench, the dial 25 can be adjusted to the desired extent. For example, it may appear that the reamed holes are one one-thousandth of an inch under size. In that event, the workman will know that by adjusting the dial the proper amount, the holes subsequently reamed will be one one-thousandth of an inch larger. Thereupon, by tightening the nut 27 and bolt 21, the reaming operation can be continued. A pin 29 in the plate 18 secures the reamer in place.

Although I have shown and described an embodiment of the invention in connection with a lathe, it is to be understood that the invention can be embodied satisfactorily in a drill press where the reamer instead of the work rotates, the work remaining stationary. It is therefore to be understood that changes in details of construction, arrangement and operation may be effected without departing from the spirit of the invention especially as defined in the appended claims.

What I claim is:

1. The method of reaming which consists in providing a reamer with a cutting head of substantially less length than the depth of the hole to be reamed and of less diameter than the diameter of such hole, offsetting angularly the axis of the reamer relative to the axis of the hole an amount predetermined according to the desired size of the reamed hole, and imparting relative translatory and rotary movements between the reamer and the work with the cutting head in such offset position.

2. The method of reaming which consists in providing a reamer with a cutting head of less diameter than the diameter of the hole to be reamed and a reduced operating shank, angularly offsetting the axis of the cutting head with respect to the axis of the hole an amount predetermined according to the desired size of the reamed hole and without the shank engaging the sides of the hole during the remaining operation, and imparting relative translatory and rotary movements between the reamer and the work with the cutting head in such offset position.

EDGAR L. ZEHRBACH.